United States Patent
Jenkins

(10) Patent No.: US 11,188,292 B1
(45) Date of Patent: Nov. 30, 2021

(54) SYSTEM AND METHOD FOR CUSTOMIZED HETERODYNING OF COLLECTED SOUNDS FROM ELECTROMECHANICAL EQUIPMENT

(71) Applicant: DISCOVERY SOUND TECHNOLOGY, LLC, Nashville, TN (US)

(72) Inventor: John Jenkins, Nashville, TN (US)

(73) Assignee: Discovery Sound Technology, LLC, Nashville, TN (US)

(*) Notice: Subject to any disclaimer, the term of this patent is extended or adjusted under 35 U.S.C. 154(b) by 139 days.

(21) Appl. No.: 16/839,165

(22) Filed: Apr. 3, 2020

Related U.S. Application Data

(60) Provisional application No. 62/828,807, filed on Apr. 3, 2019.

(51) Int. Cl.
| | |
|---|---|
| H04R 3/00 | (2006.01) |
| G06F 3/16 | (2006.01) |
| G10L 25/18 | (2013.01) |
| H04R 1/08 | (2006.01) |
| G10L 25/51 | (2013.01) |

(Continued)

(52) U.S. Cl.
CPC .............. *G06F 3/165* (2013.01); *G10L 25/18* (2013.01); *G10L 25/51* (2013.01); *H04R 1/08* (2013.01); *H04R 23/02* (2013.01); *H04R 25/353* (2013.01)

(58) Field of Classification Search
CPC . H04R 3/00; H04R 3/005; H04R 3/04; H04R 1/08; H04R 23/02; H04R 25/35; H04R 25/353; H04R 2203/00; G06F 3/16; G06F 3/165; G06F 3/167; G10L 21/00; G10L 21/003; G10L 21/0232; G10L 25/18; G10L 25/26; G10L 25/51
See application file for complete search history.

(56) References Cited

U.S. PATENT DOCUMENTS

| | | |
|---|---|---|
| 4,287,581 A | 9/1981 | Neale, Sr. |
| 4,658,245 A | 4/1987 | Dye et al. |
| 4,987,769 A | 1/1991 | Peacock et al. |

(Continued)

FOREIGN PATENT DOCUMENTS

WO 2012088707 A1 12/2010

*Primary Examiner* — Thang V Tran
(74) *Attorney, Agent, or Firm* — Patterson Intellectual Property Law, P.C.; Gary L. Montle

(57) ABSTRACT

Systems and methods are disclosed herein for customized presentation of sound data associated with the operation of electromechanical equipment, wherein users of varying hearing capabilities can ascertain conditions of the equipment in real time. A sound detection device includes transducers which collect sound signals from the equipment and convert the sound signals into digital sound data. A processor generates a first audio data set corresponding to the digital sound data received from the sound detection device and, for a given human user, identifies an audio profile comprising perceivable audio frequency ranges. A target frequency range is identified within the perceivable audio frequency ranges for the given human user, and the first audio data set is shifted or mapped to the target frequency range to generate a second audio data set. Audio output signals corresponding to the second audio data set are user-selectively delivered to the user via an audio receiver.

20 Claims, 5 Drawing Sheets

(51) Int. Cl.
*H04R 23/02* (2006.01)
*H04R 25/00* (2006.01)

(56) References Cited

U.S. PATENT DOCUMENTS

| | | |
|---|---|---|
| 5,103,675 A | 4/1992 | Komninos |
| 5,432,755 A | 7/1995 | Komninos |
| 5,436,556 A | 7/1995 | Komninos |
| 5,445,026 A | 8/1995 | Eagan |
| 5,710,377 A | 1/1998 | Youngquist et al. |
| 5,854,422 A | 12/1998 | McKeon et al. |
| 5,955,670 A | 9/1999 | Goodman et al. |
| 6,057,959 A | 5/2000 | Taylor et al. |
| 6,058,076 A | 5/2000 | Komninos |
| 6,079,275 A | 6/2000 | Komninos |
| 6,163,504 A | 12/2000 | Komninos et al. |
| 6,175,934 B1 | 1/2001 | Hershey et al. |
| 6,220,098 B1 | 4/2001 | Johnson et al. |
| 6,247,353 B1 | 6/2001 | Battenberg et al. |
| 6,295,510 B1 | 9/2001 | Discenzo |
| 6,301,514 B1 | 10/2001 | Canada et al. |
| 6,658,373 B2 | 12/2003 | Rossi et al. |
| 6,666,093 B2 | 12/2003 | Morganti |
| 6,701,725 B2 | 3/2004 | Rossi et al. |
| 6,766,692 B1 | 7/2004 | Eagan |
| 6,775,576 B2 | 8/2004 | Spriggs et al. |
| 6,782,345 B1 | 8/2004 | Siegel et al. |
| 6,809,642 B1 | 10/2004 | Brenner |
| 6,813,490 B1 * | 11/2004 | Lang ................... H04M 1/6016 455/414.1 |
| 6,923,063 B2 | 8/2005 | Komninos |
| 6,973,793 B2 | 12/2005 | Douglas et al. |
| 6,978,675 B2 | 12/2005 | Eagan |
| 7,016,742 B2 | 3/2006 | Jarrell et al. |
| 7,051,577 B2 | 5/2006 | Komninos |
| 7,079,967 B2 | 7/2006 | Rossi et al. |
| 7,099,852 B2 | 8/2006 | Unsworth et al. |
| 7,181,297 B1 | 2/2007 | Pluvinage et al. |
| 7,308,385 B2 | 12/2007 | Wegerich et al. |
| 7,540,183 B2 | 6/2009 | Komninos |
| 7,580,781 B2 | 8/2009 | Mindeman |
| 7,603,586 B1 | 10/2009 | Skladanowski et al. |
| 8,014,549 B2 | 9/2011 | Kates |
| 8,024,938 B2 | 9/2011 | Rossi et al. |
| 8,059,833 B2 | 11/2011 | Koh et al. |
| 8,245,576 B2 | 8/2012 | Komninos |
| 8,468,874 B2 | 6/2013 | Komninos |
| 8,495,914 B2 | 7/2013 | Izikoff |
| 8,872,652 B2 | 10/2014 | Komninos |
| 8,872,654 B2 | 10/2014 | Komninos |
| 9,084,050 B2 | 7/2015 | Hillis et al. |
| 10,008,193 B1 * | 6/2018 | Harvilla ................... G10H 1/20 |
| 2002/0152056 A1 | 10/2002 | Herzog et al. |
| 2004/0102928 A1 | 5/2004 | Cuddihy et al. |
| 2004/0112136 A1 | 6/2004 | Terry et al. |
| 2004/0136539 A1 | 7/2004 | Uhi et al. |
| 2004/0158474 A1 | 8/2004 | Karschnia et al. |
| 2005/0096873 A1 | 5/2005 | Klein |
| 2005/0126264 A1 | 6/2005 | Komninos |
| 2006/0053867 A1 | 3/2006 | Stumpf |
| 2006/0135907 A1 | 6/2006 | Remde et al. |
| 2006/0140418 A1 * | 6/2006 | Koh ................... H04R 25/70 381/98 |
| 2006/0164097 A1 | 7/2006 | Zhou et al. |
| 2006/0265261 A1 | 11/2006 | Wetzer et al. |
| 2007/0028693 A1 | 2/2007 | Komninos |
| 2007/0109137 A1 | 5/2007 | Farrel |
| 2007/0109138 A1 | 5/2007 | Farrell |
| 2007/0112528 A1 | 5/2007 | Farrell |
| 2008/0013751 A1 * | 1/2008 | Hiselius ................... H03G 9/14 381/102 |
| 2008/0147356 A1 | 6/2008 | Leard et al. |
| 2009/0091441 A1 | 4/2009 | Schweitzer, III et al. |
| 2009/0196431 A1 | 8/2009 | Gregg |
| 2010/0023585 A1 | 1/2010 | Nersu et al. |
| 2010/0039271 A1 | 2/2010 | Izikoff et al. |
| 2010/0067708 A1 | 3/2010 | Groth |
| 2010/0097057 A1 | 4/2010 | Karpen |
| 2010/0307860 A1 | 12/2010 | Ellingson |
| 2011/0022346 A1 | 1/2011 | Rossi et al. |
| 2011/0055669 A1 | 3/2011 | DeHaan et al. |
| 2011/0074589 A1 | 3/2011 | Han et al. |
| 2012/0035802 A1 | 2/2012 | Suzuki et al. |
| 2012/0076333 A1 | 3/2012 | Bäuml et al. |
| 2012/0230482 A1 | 9/2012 | Gavillet |
| 2013/0003981 A1 | 1/2013 | Lane |
| 2013/0046714 A1 | 2/2013 | Harris |
| 2013/0063262 A1 | 3/2013 | Shaikh et al. |
| 2013/0177164 A1 | 7/2013 | Glebe |
| 2013/0283890 A1 | 10/2013 | Komninos |
| 2014/0114612 A1 | 4/2014 | Yoskovitz et al. |
| 2014/0309549 A1 | 10/2014 | Selig et al. |
| 2014/0334644 A1 | 11/2014 | Selig et al. |
| 2015/0078575 A1 | 3/2015 | Selig et al. |
| 2016/0100265 A1 | 4/2016 | Maggiore et al. |
| 2016/0100266 A1 | 4/2016 | Propp |
| 2016/0302019 A1 | 10/2016 | Smith et al. |
| 2020/0013422 A1 * | 1/2020 | Matkin ................... G10L 21/0232 |
| 2020/0296510 A1 * | 9/2020 | Li ................... G06F 3/167 |
| 2020/0304910 A1 * | 9/2020 | Karstens ................... H03G 3/20 |

* cited by examiner

SYSTEM AND METHOD FOR CUSTOMIZED HETERODYNING OF COLLECTED SOUNDS FROM ELECTROMECHANICAL EQUIPMENT

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

BACKGROUND

The present invention relates generally to the collection and spectral analysis of sound data from electromechanical equipment. More particularly, the present invention relates to systems and methods configured for customized presentation of such sound data for individual hearing profiles.

It is known to collect sound data from electromechanical equipment, digitize said data, and perform comparative analytics using for example machine learning algorithms. Such algorithms disregard the actual audio signals, as computer-generated representation and/or visualization of the digital data logically correlates with the underlying sounds. However, it is still useful or even necessary in many applications to provide the audio output for manual review in real time by a technician or support analyst, or as recorded and played back on demand at a later time. Unfortunately, human audio capabilities are not standard, and it may be readily appreciated that such technicians or support analysts will have various stages of hearing loss or inadequacy. Anomalies will accordingly arise where the audio output is itself standardized in nature-not due to a lack of experience, repetition, or environment, but rather because of individual distinctions that are desirably accounted for to universally enable all users to hear and analyze each audio data set.

BRIEF SUMMARY

System and methods are accordingly disclosed herein for customized presentation of sound data associated with the operation of an electromechanical device.

In an embodiment, such a system may include a sound detection device comprising one or more transducers configured to collect sound signals from the electromechanical device, and further configured to convert the sound signals into digital sound data. A processor is operatively linked to the sound detection device via a communications network and configured to perform the following operations. A first audio data set is generated corresponding to the digital sound data received from the sound detection device, and for a given human user an audio profile is identified as comprising one or more perceivable audio frequency ranges. A target frequency range is determined within the one or more perceivable audio frequency ranges for the given human user, and the first audio data set is shifted or mapped to the target frequency range to generate a second audio data set. Audio output signals corresponding to the second audio data set are user-selectively delivered to the user via an audio receiver.

In another embodiment as disclosed herein, shifting or mapping the first audio data set to the target frequency range comprises heterodyning the first audio data set to generate the second audio data set having a bandwidth corresponding to a bandwidth for the first audio data set.

In another embodiment as disclosed herein, the determined target frequency range comprises a bandwidth corresponding to a bandwidth for the first audio data set.

In yet another embodiment as disclosed herein, the target frequency range is user-selectable.

In yet another embodiment as disclosed herein, the second audio data set is generated using frequency compression to match the target frequency range.

In yet another embodiment as disclosed herein, the audio profile is selectively retrieved from data storage operably linked to the processor. The data storage may reside in the sound detection device, or may for example reside in a server.

In one exemplary aspect of the aforementioned embodiment, the audio profile is generated pursuant to execution of one or more audio testing tools, via at least a user interface generated by the processor, and stored in the data storage for selective retrieval. The user interface may be configured to receive user input associated with a plurality of audible tones delivered to the user at different frequencies.

In yet another embodiment of the system, the sound detection device is mounted to the electromechanical device and configured to continuously collect the sound signals, and the one or more transducers are positioned in a non-contact arrangement transversely with respect to a surface of the electromechanical device.

Alternatively, the sound detection device may comprise a portable housing from which extends a flexible tube having the one or more transducers residing therein, and a communications module for transmitting the digital sound data.

DETAILED DESCRIPTION

Figure 1:
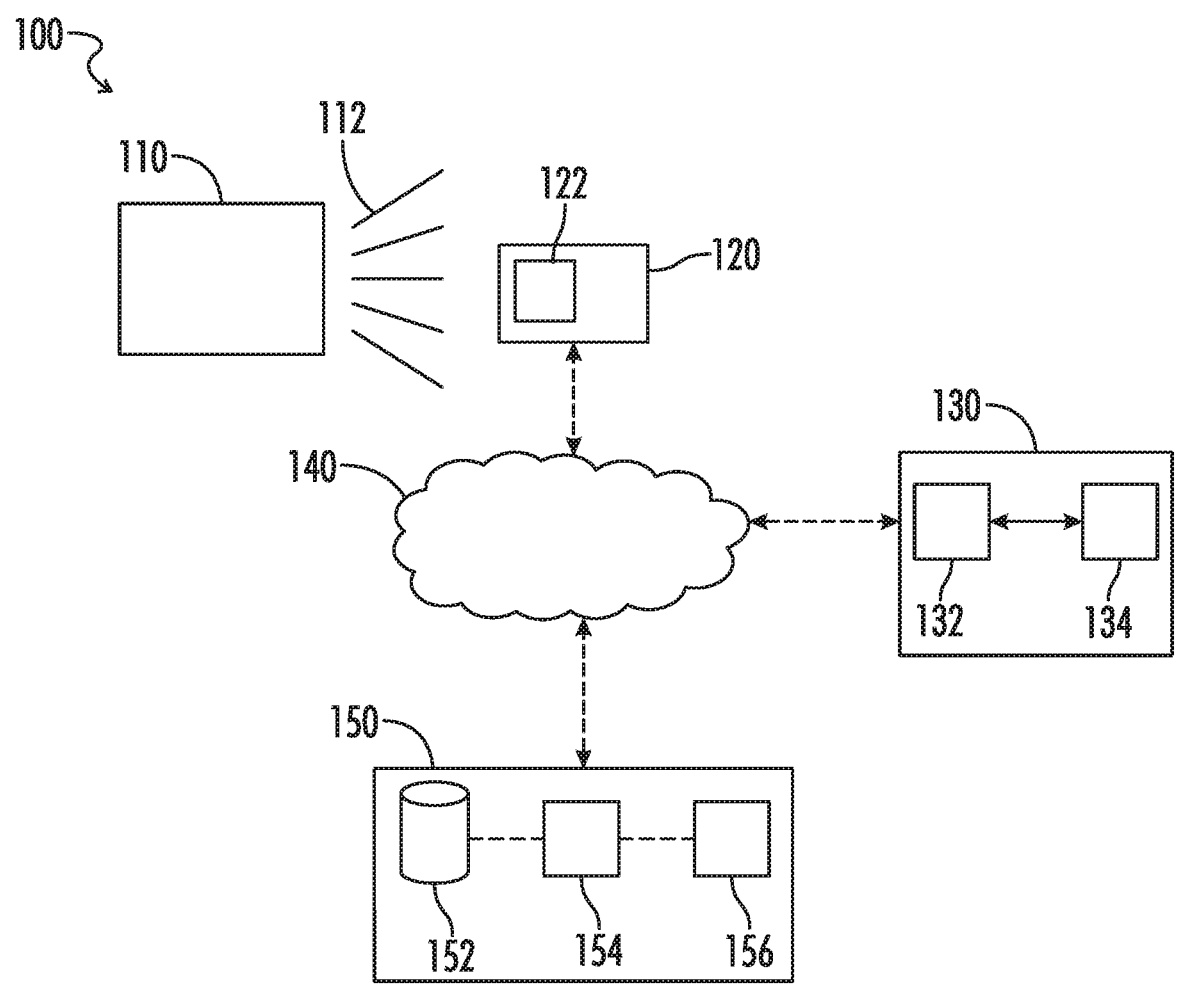
FIG. 1 is a block diagram representing an exemplary embodiment of a system as disclosed herein.

Referring generally to FIGS. 1-4, various exemplary embodiments of an invention may now be described in detail. Where the various figures may describe embodiments sharing various common elements and features with other embodiments, similar elements and features are given the same reference numerals and redundant description thereof may be omitted below.

Referring more particularly to FIG. 1, an embodiment of a system 100 according to the present disclosure includes an electromechanical device 110 to which a sound detection device 120 is operatively connected or respective to which it may be selectively positioned. The sound detection device may comprise one or more transducers 122 effective to periodically or continuously receive at least analog sound signals 112 from the electromechanical device and convert said signals into digital sound data. The sound detection device may further be effective to generate one or more digital data files based upon the received sound signals, predefined parameters, or other variable inputs, such that the digital data files comprise the digital sound data, the type of electromechanical device to which the sound detection device is operatively connected or proximately located, and the location of the electromechanical device and/or sound detection device.

The terms "electromechanical device" or "electromechanical equipment" as interchangeably used herein are not limited in scope with respect to a particular field of use, but generally refer within the scope of the present invention to electrical or electro-mechanical devices, components, or systems that generate or emit sound energy representative of flaw, excessive wear, and/or failure (e.g., creating measurable changes in air pressure based on changes in work intensity), and may typically include, without limitation, transformers, switching power converters, air compressors, boilers, chillers, air condensing units, cooling towers, pumps, motors, fans, piston compressors, reciprocal compressors, and the like.

In certain embodiments, one or more of the sound detection device 120 and the one or more transducers 122 may be installed as original-equipment-manufactured components of the electromechanical device 110. In alternative embodiments, the sound detection device and transducer may comprise a functional sound detection module installable as an aftermarket component in or relative to the electromechanical device. In said embodiments, the type of electromechanical device and location of the electromechanical device or sound detection device may be predefined in accordance with the installation of the component or module.

In certain embodiments, the sound detection device 120 may further be able to transmit at least the digital sound data or the digital data files across a communications network 140 to a host server 150. In one embodiment, the sound detection device may transmit digital data files across the Internet by means of a modem to an Internet-connected monitoring server. In an alternative embodiment, the sound detection device may transmit digital data files on a local intranet network to a local host server. In further embodiments, the digital sound data or the data files may be downloadable from the sound detection device to a portable data storage for selective transmittal and downloading to the host server, or otherwise selectively connected to the host server via a wired connection for data transmittal there between. In yet another embodiment, the sound detection device may at least temporarily retain the digital sound data and digital data files in storage thereon, wherein the server is at least periodically connected to the sound detection device for accessing and processing the data without requiring transmittal of the data from the local storage to a data storage associated with the server itself.

The local host server may be configured to receive input from a plurality of sound detection devices or other automated monitoring devices and provide a centralized point of feedback for the performance and operation of one or more electromechanical systems.

In certain embodiments, the server 150 (or alternatively, a plurality of functionally and/or communicatively linked servers) may include or otherwise implement a database 152, a computer-readable medium 154 having program instructions such as for example spectral analysis software residing thereon, and executable by a processor 156. In execution of a method according to the present invention, the server may be linked to or otherwise access an external database which may be associated with a remote data source in addition to any hosted or otherwise local database or databases residing on or in association with the server(s).

The term "computer-readable medium" as used herein may refer to any non-transitory memory or storage medium or as one of a plurality of non-transitory memory or storage media within which is embodied a computer program product that includes processor-executable software, instructions, program modules, etc., which upon execution may provide data or otherwise cause a computer system to implement subject matter or otherwise operate in a specific manner as further defined herein. It may further be understood that more than one type of computer readable medium may be used in combination to conduct processor-executable software, instructions, program modules, etc., from a first medium upon which the software, instructions, program modules, etc., initially reside to a processor for execution.

In certain embodiments, the processor 156 may execute software instructions stored on the computer-readable medium 154 effective to receive the digital data files via the network 140 and store said digital data files in the database 152. The processor may further execute software instructions stored on the computer-readable medium effective to determine one or more models of baseline data in association with the digital data files and compare the baseline data to the digital data files for purposes of determining a status of operation. The processor may still further execute software instructions stored on the computer-readable medium effective to identify variations between the digital sound data stored in the database and the selected comparative baseline data and associate said variations with one or more types of failure or substandard operation of the electromechanical device 110.

In further embodiments, the processor 156 may execute software instructions stored on the computer-readable medium 154 effective to create, adjust, or modify baseline data in association with one or more modes of operation and store the modified baseline data in the database 152. In an exemplary embodiment, the processor may execute software instructions effective to determine model baseline data in accordance with digital sound files associated with one or more types of electromechanical devices such that, for a plurality of electromechanical devices 110 one or more modes of operation are determined. In a further exemplary embodiment, the software instructions may be effective to determine model sound data associated with the suboptimal performance or failure of one or more components in the electromechanical device in accordance with a plurality of digital sound files received over a period of time, such that received sound data files of a certain type may be compared against various models to predict the rate of degradation of the electromechanical device or its constituent components.

In certain embodiments, the processor 156 may send an alert across the communications network 140 to an endpoint device 130 associated with a monitoring user. An endpoint device processor 132 may be effective to receive the alert from the communications network and display the alert within a user interface generated on a display device 134 associated with the endpoint device. Certain embodiments of the endpoint device may include, for example, a personal computer, a smart phone, a tablet computer, a specialized diagnostic device, a control module for the electromechanical device, and the like.

In further certain embodiments, the personal mobile computing device 130 may execute computer program instructions upon user initiation to generate a user interface 134 including dashboards and associated program tools for purposes of displaying the generated alert. In another embodiment, the display device may be associated with the server 150 in configuration as a control device, monitoring device, or host device for a plurality of sound detection devices 120.

Whereas the aforementioned embodiments may refer to the transmittal or otherwise obtaining of sound data from the sound detection device for the purpose of processing and analysis by the remote server, it may be understood that in certain embodiments (not shown) the sound detection device itself may be configured with a display unit, processor and one or more computer readable media having the requisite program instructions residing thereon for executing any or all of the functions recited herein for customized presentation of sound data at the site of the electromechanical equipment. In certain such embodiments, the sound detection device 120 and the personal mobile computing device 130 may be integrated within effectively the same device housing, or may operate in association with each other without requiring data transmittal to or from a host server.

The term "user interface" as used herein may, unless otherwise stated, include any input-output module by which a user device facilitates user interaction with respect to at least the hosted server including, but not limited to, web browsers; web portals, such as individual web pages or those collectively defining a hosted website; telephony interfaces such as interactive voice response (IVR); and the like. Such interfaces may in a broader sense include pop-ups or links to third party websites for the purpose of further accessing and/or integrating associated materials, data, or program functions via the hosted system and in accordance with methods of the present invention. A user interface may further be described with respect to a sound detection device or personal mobile computing device in the context of buttons and display portions which may be independently arranged or otherwise interrelated with respect to, for example, a touch screen, and may further include audio and/or visual input/output functionality even without explicit user interactivity.

Figure 2:
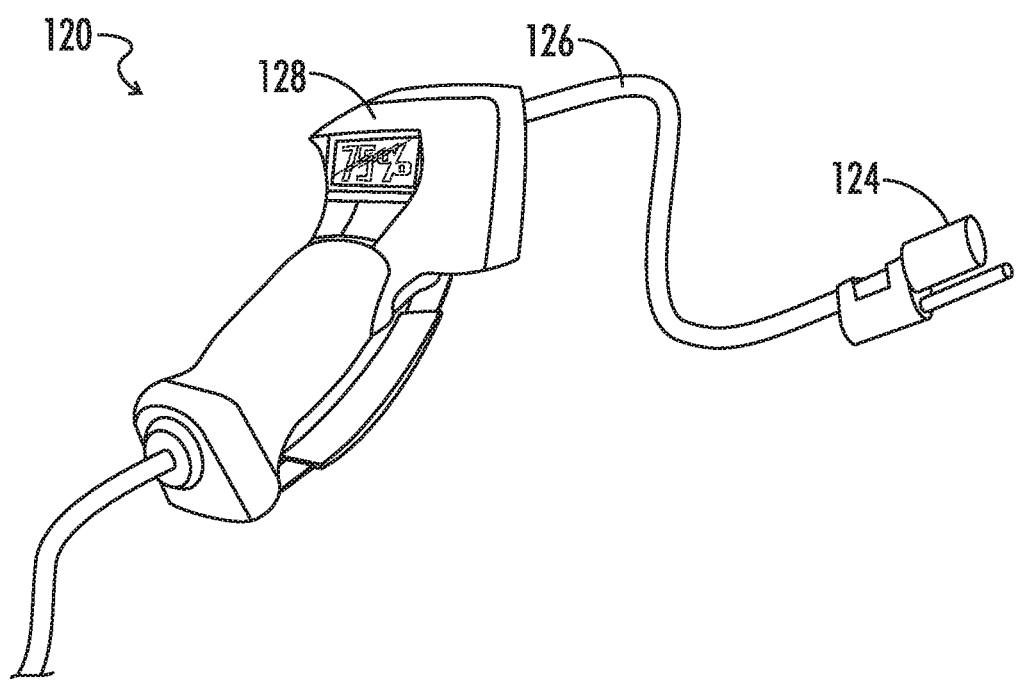
FIG. 2 is an isometric view of one embodiment of a sound detection device according to the system of FIG. 1.

Referring next to FIG. 2, in a particular and exemplary embodiment a sound detection device 120 may include an ultrasound measurement unit with a portable housing about or within which is disposed a flexible tube 126, a sound cup 124 on a distal end of the flexible tube relative to the housing, a display portion 128, user interface components such as buttons, dials, etc., and actuators such as for example a trigger-style button.

Generally stated, the sound detection device 120 may measure air pressure created from the intensity of the work at the source, rather than mere sound measurement. Sound is but a medium by which we can measure that work in a non-contact manner. One or more piezoelectric transducers 122 disposed within the flexible tube 126 are effective to receive analog ultrasound signals and convert the signals to electrical (digital) impulses that are then filtered and amplified by appropriate circuitry and digital logic components. The device may generate sound data files based on the filtered and amplified digital impulse signals for internal measurement, conversion and display, and further for external transmission to the remote server 150 or other device for storage and analysis as further described below. Various embodiments of the device may further or alternatively convert the filtered and amplified digital impulses back to analog signals for user examination of the represented sound data via an audio output mechanism such as for example noise attenuating headphones or an equivalent.

Notwithstanding the previous exemplary description of a sound detection device, a system as disclosed herein does not require the specific features of such a device, or even a mobile sound detection device, unless otherwise specifically stated. A sound detection device within the scope of the present invention may for example include a sound detection module (not shown) that is permanently or semi-permanently affixed to the electromechanical equipment, with one or more sound collecting elements (e.g., non-contact transducers) positioned accordingly. In one embodiment, a transducer in accordance with a sound detection module may be mounted with respect to the electromechanical device at a 0° angle of reference such that the transducer receives sound waves perpendicular to the surface of the electromechanical device. The transducer may further be isolated from physical vibrations and other relevant effects generated by the electromechanical device via a shroud formed of a material such as elastic, situated between the electromechanical device and the transducer. The shroud may preferably have high form retention characteristics and effective to return the transducer to the preferred 0° angle of reference upon dislocation by, e.g., physical vibration. The transducer may be operatively connected to the sound detection device by means of a sound dampening tube of a length corresponding to a distance between the desired mounting position and the module. Such affixed devices may be configured to continuously collect and transmit sound data over time, or to store and periodically transmit sound data.

Figure 3:
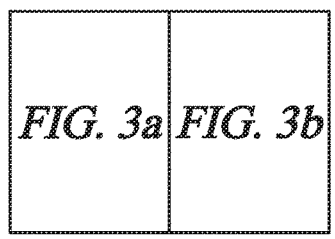
FIGS. 3a and 3b are a flowchart representing an exemplary method for comparative analysis of sound data provided by the system of FIG. 1.
Figure 3A:
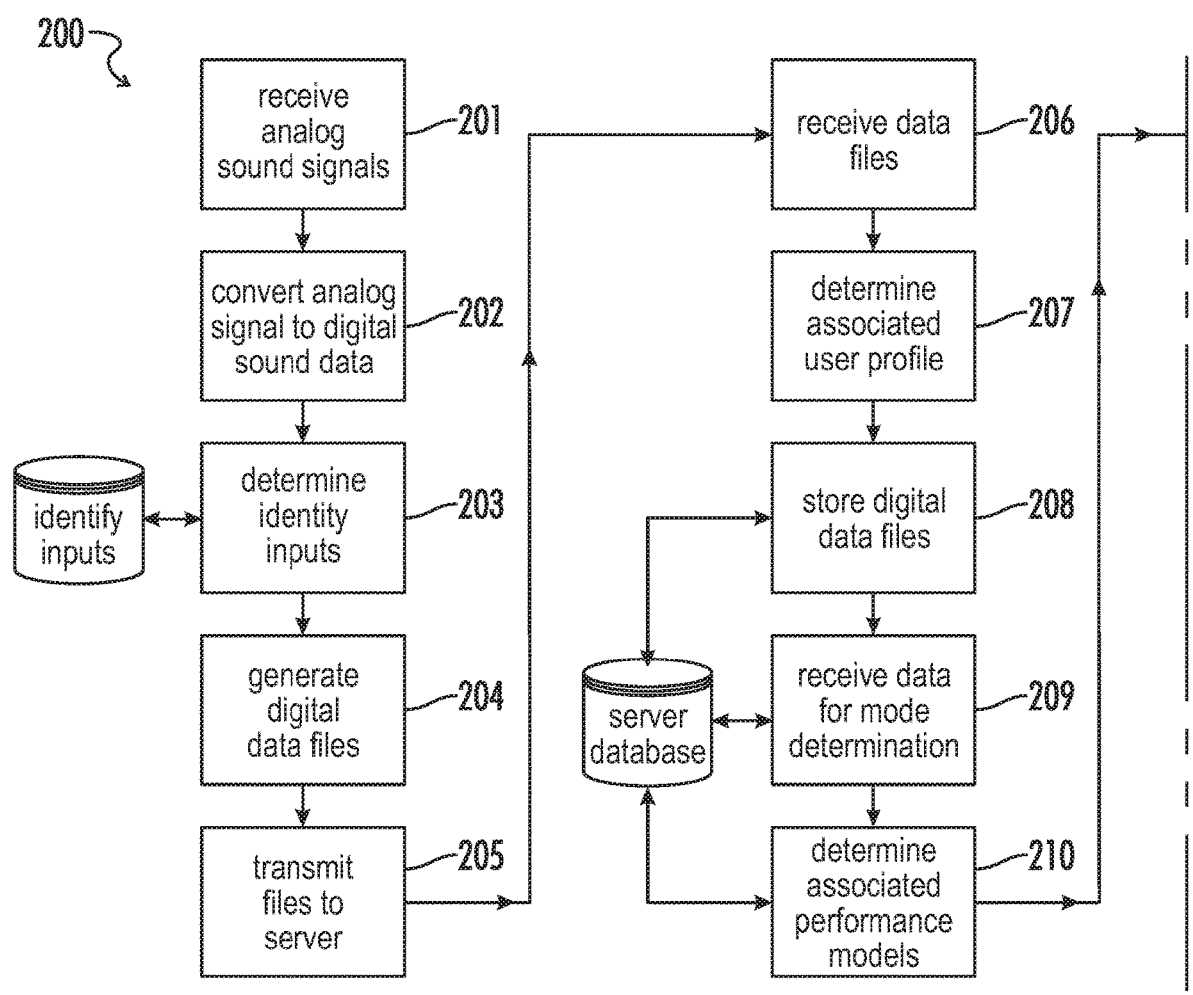
Figure 3B:
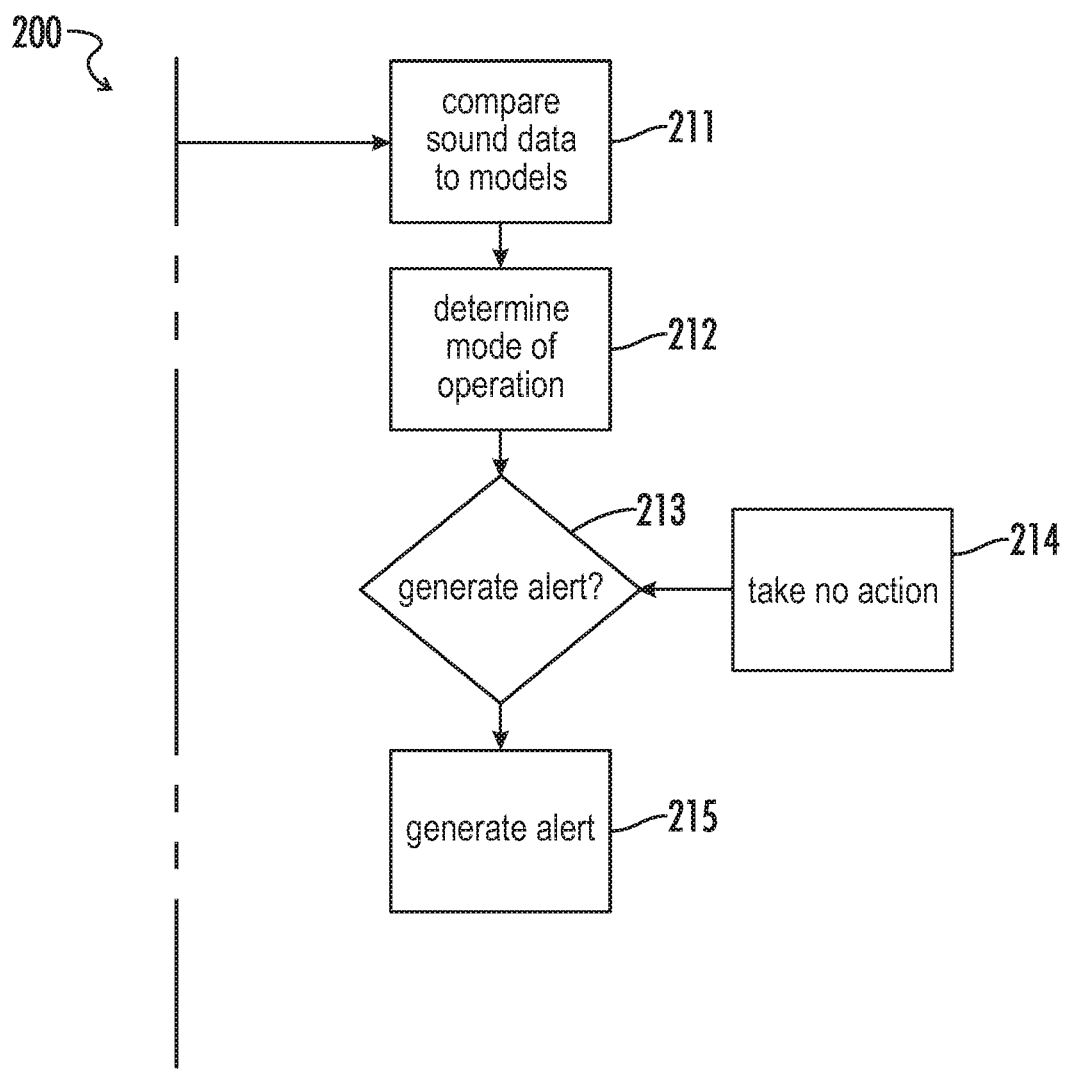

Referring now to FIG. 3, an exemplary series of steps for comparative analysis of sound data associated with the operation of an electromechanical device may be described in association with at least the embodiment of a sound detection system represented in FIG. 1 and described above.

Steps 201 to 205 refer generally to a method for receiving and transmitting sound data to a server. The method 200 begins at a first step 201 when a sound detection device receives analog sound signals associated with the operation of an electromechanical device. In step 202, the sound detection device converts the analog sound signal to digital sound data. In certain embodiments, the analog-to-digital conversion may be achieved by means of one or more transducers.

In step 203, the sound detection device determines identity inputs comprising at least location information and electromechanical device type based upon one or more parameters. In certain embodiments, the location information may pertain to the location of the sensor, or in alternative embodiments, the location information may pertain to the location of the electromechanical device. In further embodiments, the electromechanical device type may be determined from a plurality of predetermined makes and models of electromechanical devices. The identity inputs may be predefined in accordance with the installation of the sound detection device, or alternatively, the sound detection device may determine the identity inputs from signals received via the transducers or via other sensors.

In step 204, the sound detection device associates the digital sound data with the determined identity inputs and generates one or more digital data files comprising the digital sound data and the identity inputs. In step 205, the sound detection device transmits the one or more digital data files to a server across a communications network, although as noted herein it may be understood that the comparative analytics may alternatively be performed at an endpoint device or even by the sound detection device itself wherein no transmittal of data files to the server is necessary.

Steps 206 to 212 refer generally to the comparing of received sound data to model data for purposes of detecting suboptimal electromechanical device performance.

In step 206, the server receives the one or more digital data files from the sound detection device. In certain embodiments, the server may be configured to receive files from a plurality of sound detection devices in association with one or more electromechanical devices. In an embodiment, the server may be employed as an Internet-connected monitoring device for a host user to monitor the ongoing performance of certain electromechanical devices associated with clients across a broad geography. In another embodiment, the server may function as an on-site monitoring device for one or more electromechanical devices within a given geographical location, such as, for example, an office building or industrial complex. The receipt of the files may be performed either periodically or continuously.

Upon receiving the digital data files, the server determines from the identity inputs within the digital data files an associated user profile 207. The user profile may be associated with any number of uniquely identifying traits, such as an electromechanical device SKU, a model number, a client name and device ID, a geographic location, and the like. The server then stores the received digital data files in one or more databases in association with the user profile 208.

In step 209, the server retrieves the digital sound data associated with a user profile for purposes of determining one or more modes of operation for an electromechanical device. In certain embodiments, the server may retrieve a plurality of digital sound data, such as, for example, the sound data received from all sound detection devices installed in an electromechanical device, or a period of historical sound data generated by a single sound detection device.

The server then determines one or more associated performance models against which to compare the digital sound data of the retrieved sound files 210. In certain embodiments, the performance models may be preconfigured in association with operative modes of performance for a particular electromechanical device. For example, the server may be configured to retrieve models associated with various modes of general performance for an electromechanical device of a certain type, make, or model. In further embodiments, the server may be configured to retrieve models associated with the failure or suboptimal performance of specific components within the electromechanical device. In still further embodiments, the server may generate performance models from analysis of historical trend data determined from the electromechanical device or a plurality of devices of similar type, make, or model.

In step 211, the server compares the retrieved digital sound data with the determined performance models. In certain embodiments, the server may optionally perform certain transformations to the digital sound data to effect a better comparison, such as, for example, reducing noise, applying filters, removing data point outliers, amplifying the signal, and the like. In an embodiment, the server may compare the digital sound data to a series of performance models to find matched similarities indicating mode of operation. In an alternative embodiment, the server may compare the digital sound data to one or more performance models to determine identifiable differences indicating a mode of operation. From the comparison, the system determines a mode of operation for the electromechanical device (212).

Steps 213 to 215 refer generally to the generation of an alert effective to notify a user of suboptimal operation of the electromechanical device.

On determination of a mode of operation in accordance with step 212, the server then determines from the diagnosed mode of operation whether an alert should be generated 213.

In certain embodiments, certain modes of operation may be pre-associated with alert generation. For example, certain modes of operation associated with the failure of certain components within the electromechanical device may be associated with alert statuses. In alternative embodiments, the server may determine whether to generate an alert based upon one or more predictive analysis models, such as predicting the failure of a device component from a history of sound data.

If the server determines that no alert should be generated, the system returns to its default monitoring state without taking further action 214. Alternatively, if the server determines that an alert should be generated, it instead proceeds to step 215 and generates an alert to notify an end-user as to the status of the electromechanical device. In preferred embodiments, the server may include with the alert diagnostic information and/or proposed corrective actions. In certain embodiments, the server may send the alert across the to an end-point device associated with the end-user. In one or more steps not depicted, the endpoint device may generate a user interface and, upon receipt of the alert from the server, populate the user interface with the alert and respective alert information. In further optional steps, the server may determine whether corrective action has been performed by, for example, receiving notification from the user that corrective action has been performed. In an alternative example, the server may determine whether corrective action has been performed when received sound data indicates optimal performance has resumed. In still another example, the server may receive notification from specially configured sound detection devices effective to forward repair log data that an authorized repair has been performed.

Figure 4:
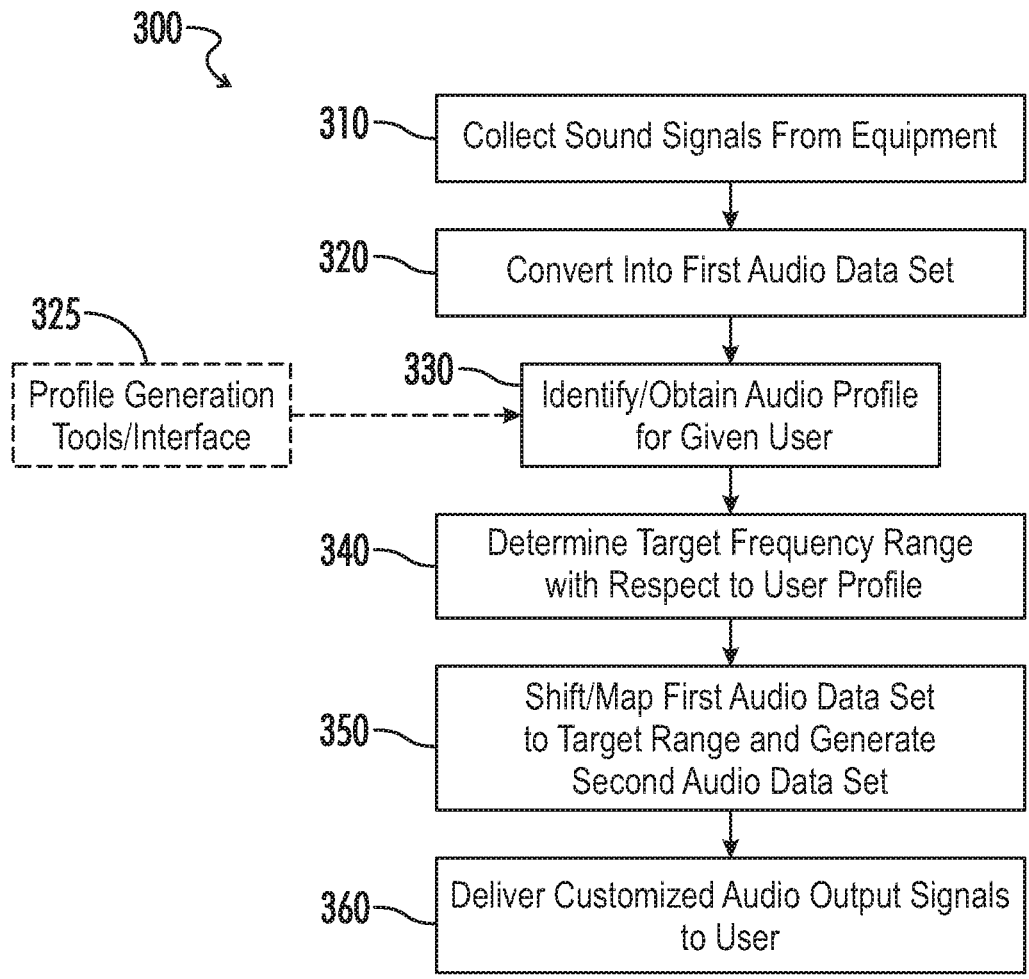
FIG. 4 is a flowchart representing an exemplary embodiment of a method for generating and providing customized audio output to individual users in accordance with the present disclosure.

Referring now to FIG. 4, an embodiment of a method 300 is disclosed herein for customized presentation of sound data. The method begins with a step 310 of collecting sound signals from electromechanical equipment, which as previously noted may include one or more preliminary steps (not shown) depending on the type of sound detection device being implemented. If a static sound detection device is being implemented, the device is mounted to the equipment with one or more transducers positioned properly to collect sound data therefrom. The static device may include a housing with anti-vibration elements such as shrouding material and a dedicated sound collection tube mounted to the housing of equipment to provide an exemplary non-contact sound collection environment, wherein for example the one or more transducers may be positioned transversely with respect to surface of the electromechanical device. Alternatively, a user may selectively implement a mobile sound collection device having any arrangement of transducers or other sound collecting elements capable of obtaining sound signals from the equipment.

In a second step 320, implemented either at the sound detection device or at a remote processing unit such as for example associated with a hosted server, the collected sound signals are converted into a first audio data set.

In another step 330, the system identifies or obtains an audio profile for a given user. The audio profile as referred to herein may at least include one or more perceivable audio frequency ranges. For example, a particular user may be able to perceive audio frequencies across a continuous range having first and second endpoints (e.g., from frequency A to frequency D), whereas another user may be compromised in hearing capabilities with respect to either or both of the endpoints, such that the overall perceivable audio frequency range is substantially reduced (e.g., from a frequency A' to D). Other users may have multiple perceivable audio frequency ranges, defining a non-continuous range, where for example the user cannot adequately perceive sounds at certain frequencies in a "dead zone" otherwise within the overall range (e.g., able to perceive audio from A to B, and from C to D, but not at frequencies between B and C). There is no inherent limit to the number of perceivable audio frequency ranges that may be associated with a given user. The thresholds for determining what are/are not perceivable audio frequencies may in certain embodiments vary across different parameters such as for example types of electro-mechanical equipment. An audio profile for a given user may also optionally be associated with a date at which the profile was generated, wherein after a certain period of time or in association with for example the user's age or other parameters, the system may require that the audio profile be confirmed or updated.

In various embodiments, the audio profile for a given user may be retrieved or uploaded from an associated data storage associated with the host system or from a third-party system. In embodiments where the sound detection device is a mobile unit as described herein, the data storage may for example be provided within the sound detection device itself, thereby eliminating the need for server communications in certain remote applications.

Alternatively, in a preliminary step 325 the audio profile may optionally be generated via a hosted user interface and associated tools. The system may prompt users to self-test themselves when for example an audio profile is unavailable, or otherwise when an available audio profile is deemed invalid as out of date or non-compatible with the host system. The system may require re-calibration or generation of an audio profile for the user, even where an audio file for that user has previously been generated and is available, where for example a different audio output device is going to be used and/or the user is in a location or context having associated ambient sounds. Users may alternatively prompt the system to initiate a self-test to generate a new audio profile. In an embodiment, one or more tones may be generated by the system across one or more frequency ranges, along with user input tools to identify for example when a sound can or cannot be heard. The self-test may include a sweeping sine tone across a theoretical maximum frequency range (e.g., from 20 Hz to 20 kHz), or alternatively may select a plurality of frequencies within a more practical range relative to expected frequencies of the audio data sets from the electromechanical equipment. In an exemplary embodiment, the system may further display the results of an audio self-test to the user via an audiogram or an equivalent.

Once an audio profile for the user has been identified or obtained, the system may next in step 340 determine a target frequency range for the audio output, based upon or otherwise with respect to the user profile. In other words, a target frequency range will be determined within any one of the one or more perceivable audio frequency ranges associated with the audio profile for the current user. The determined target frequency range may preferably comprise a bandwidth that corresponds to a bandwidth for the first audio data set. The determined target frequency range may be user-selectable via an interface that may be presented on the sound detection device for mobile applications or otherwise via a computing device linked to the host server. For example, the user may be enabled to select a specific range, or after an initial range has been automatically selected to specify that a different target frequency range is to be used. In certain contexts, it may be that an otherwise perceivable audio range corresponding to the initially selected target frequency range is undesirable, and therefore the user would prefer a lower or higher target frequency range.

The first audio data set as converted from the raw sound signals may now be shifted or mapped to the target frequency range of the user's audio profile, in step 350. Such modification of the first audio data set does not involve a transfer function to for example match the collected sounds to a complete perceivable audio range of the user, but rather merely moves the first audio data set to an appropriate and analogous area without dead spots within the user's audio range. In various embodiments, this step comprises or implements a customized heterodyne of the raw audio data to accordingly produce a second audio data set having a bandwidth corresponding to a bandwidth for the first audio data set. In certain contexts, for generation of the second audio data set it may be preferable to utilize frequency compression to match the target frequency range.

Customized audio output signals corresponding to the second audio data set can then be delivered to the user (step 360), for example via speakers, headphones, or the like. In some embodiments, a type or model of audio output device and/or various ambient noise conditions may be accounted for in generation of the user's audio profile or otherwise with respect to the customized heterodyne.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable medium known in the art. An exemplary computer-readable medium can be coupled to the processor such that the processor can read information from, and write information to, the memory/storage medium. In the alternative, the medium can be integral to the processor. The processor and the medium can reside in an ASIC. The ASIC can reside in a user terminal. In the alternative, the processor and the medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The previous detailed description has been provided for the purposes of illustration and description. Thus, although there have been described particular embodiments of a new and useful invention, it is not intended that such references be construed as limitations upon the scope of this invention except as set forth in the following claims.

What is claimed is:

1. A system for customized presentation of sound data associated with the operation of an electromechanical device, the system comprising:
    a sound detection device comprising one or more transducers configured to collect sound signals from the electromechanical device, and further configured to convert the sound signals into digital sound data;
    a processor operatively linked to the sound detection device and configured to
        generate a first audio data set corresponding to the digital sound data received from the sound detection device,
        identify for a given human user an audio profile comprising one or more perceivable audio frequency ranges,
        determine a target frequency range within the one or more perceivable audio frequency ranges for the given human user,
        shift or map the first audio data set to the target frequency range to generate a second audio data set, and
        user-selectively deliver audio output signals corresponding to the second audio data set via an audio receiver.

2. The system of claim 1, wherein shifting or mapping the first audio data set to the target frequency range comprises heterodyning the first audio data set to generate the second audio data set having a bandwidth corresponding to a bandwidth for the first audio data set.

3. The system of claim 1, wherein the determined target frequency range comprises a bandwidth corresponding to a bandwidth for the first audio data set.

4. The system of claim 1, wherein the target frequency range is user-selectable.

5. The system of claim 1, wherein the second audio data set is generated using frequency compression to match the target frequency range.

6. The system of claim 1, wherein the audio profile is selectively retrieved from data storage operably linked to the processor.

7. The system of claim 6, wherein the data storage resides in the sound detection device.

8. The system of claim 6, wherein the data storage resides in a server.

9. The system of claim 8, wherein the audio profile is generated pursuant to execution of one or more audio testing tools, via at least a user interface generated by the processor, and stored in the data storage for selective retrieval.

10. The system of claim 9, wherein the user interface is configured to receive user input associated with a plurality of audible tones delivered to the user at different frequencies.

11. The system of claim 1, wherein the sound detection device is mounted to the electromechanical device and configured to continuously collect the sound signals, and the one or more transducers are positioned in a non-contact arrangement transversely with respect to a surface of the electromechanical device.

12. The system of claim 1, wherein the sound detection device comprises a portable housing from which extends a flexible tube having the one or more transducers residing therein, and a communications module for transmitting the digital sound data.

13. A method for customized presentation of sound data, comprising:
    collecting sound signals from an electromechanical device, via an electromechanical device comprising one or more transducers;
    converting the sound signals into a first audio data set;
    identifying for a given human user an audio profile comprising one or more perceivable audio frequency ranges;
    determining a target frequency range within the one or more perceivable audio frequency ranges for the given human user;
    shifting or mapping the first audio data set to the target frequency range to generate a second audio data set; and
    user-selectively delivering audio output signals corresponding to the second audio data set via an audio receiver.

14. The method of claim 13, wherein shifting or mapping the first audio data set to the target frequency range comprises heterodyning the first audio data set to generate the second audio data set having a bandwidth corresponding to a bandwidth for the first audio data set.

15. The method of claim 13, wherein the determined target frequency range comprises a bandwidth corresponding to a bandwidth for the first audio data set.

16. The method of claim 13, wherein the target frequency range is user-selectable.

17. The method of claim 13, wherein the second audio data set is generated using frequency compression to match the target frequency range.

18. The method of claim 13, wherein the audio profile is selectively retrieved from data storage.

19. The method of claim 18, further comprising generating the audio profile pursuant to execution of one or more computer-implemented audio testing tools and an associated user interface, and storing the audio profile in the data storage for selective retrieval.

20. The method of claim 19, further comprising receiving at the user interface user input associated with a plurality of audible tones delivered to the user at different frequencies.

\* \* \* \* \*